United States Patent [19]

Jennings

[11] 3,804,173

[45] Apr. 16, 1974

[54] METHOD FOR REDUCING POLYMER ADSORPTION IN SECONDARY OIL RECOVERY OPERATIONS

[75] Inventor: Robert R. Jennings, Walnut Creek, Calif.

[73] Assignee: The Dow Chemical Company, Midland, Mich.

[22] Filed: Mar. 9, 1972

[21] Appl. No.: 233,305

Related U.S. Application Data

[63] Continuation-in-part of Ser. No. 159,054, July 1, 1971, abandoned.

[52] U.S. Cl............. 166/275, 166/274, 166/305 R, 252/8.55 D
[51] Int. Cl............................................. E21b 43/16
[58] Field of Search................ 166/274, 305 R, 275; 252/8.55 D

[56] References Cited
UNITED STATES PATENTS

| | | | |
|---|---|---|---|
| 3,476,186 | 11/1969 | Sarem................................. | 166/274 |
| 3,039,529 | 6/1962 | McKennon.......................... | 166/275 |
| 2,827,964 | 3/1958 | Sandiford et al................... | 252/8.55 D |
| 3,437,140 | 4/1969 | Foster et al......................... | 252/8.55 D |
| 3,684,014 | 8/1972 | Norton et al....................... | 252/8.55 D |

*Primary Examiner*—Ernest R. Purser
*Assistant Examiner*—Jack E. Ebel
*Attorney, Agent, or Firm*—Roger Lochhead

[57] ABSTRACT

In a secondary oil recovery operation where water soluble, high molecular weight polymers (i.e., $\geq 1.5 \times 10^6$) are used to increase the viscosity of the oil displacing medium, adsorption of said polymers onto the reservoir's surface can be substantially decreased by the utilization of polymer conserving agents comprising low molecular weight (i.e., $\leq 5 \times 10^5$) polymers which contain one or more of the following monomers: acrylamide and N-substituted acrylamides; acrylic acid and ammonium, alkali or alkaline earth metal salts thereof; acrylonitrile; vinyl alcohol; vinyl ethers, esters and ketones; vinyl sulfonic acid salts; ethylenically unsaturated di-basic acid salts; styrene sulfonates; and the like.

10 Claims, No Drawings

METHOD FOR REDUCING POLYMER ADSORPTION IN SECONDARY OIL RECOVERY OPERATIONS

CROSS-REFERENCE TO OTHER APPLICATION

This application is a continuation-in-part of my prior Application Ser. No. 159,054, filed July 1, 1971, and now abandoned.

BACKGROUND OF THE INVENTION

The efficiency of the primary recovery of petroleum from subterranean reservoirs is limited by the natural forces available. In order to recover further oil, supplemental techniques, generally referred to as secondary (as opposed to primary) recovery operations, are commonplace. Typically, the remaining oil is displaced by a medium such as a gas, aqueous liquid, an oil-miscible liquid or a water and oil-miscible liquid, and recovered on the surface.

In order for secondary recovery operations to be attractive they must be efficient, i.e., the displacing medium must sweep a substantial amount of the remaining oil from the reservoir. However, the sweep efficiency is hindered by permeability differences in the formations defining the reservoir, causing channeling, i.e., the tendency of the displacing medium to follow the path of least resistance (highest permeability), thereby either completely missing or poorly sweeping oil from other formations in the reservoir. Channeling may also occur due to mobility differences between the displacing medium and the oil to be recovered.

As evidenced by a number of U.S. Pat. Nos. (2,827,964, 2,842,492, 3,039,529, 3,282,337, 3,476,186 and others), the art has found that channeling problems may be lessened by the utilization of displacing media, generally consisting of an aqueous liquid, typically water or brine which contains a water-soluble agent to increase its viscosity.

However, the art has also found (See U.S. Pat. No. 3,478,823 and 3,523,581 (Murphy), and 3,532,166 (Williams)) that while sweep efficiency is increased by the use of a thickened aqueous displacing medium, certain types of thickening agents exhibit a propensity to adsorb on active sites in the treated reservoir. Thusly, the sweep efficiency suffers due to the decreased viscosity of the medium, to say nothing of the loss of thickening agent.

SUMMARY OF THE INVENTION

It has now been found that the adsorption of certain thickening agents, hereinafter called mobility control polymers, used with aqueous displacing liquids can be substantially limited by utilizing certain polymer conserving agents.

The invention, then, is an improved process for displacing oil in a secondary oil recovery operation without the heretofore experienced loss of mobility control polymer by adsorption. The process comprises introducing into one or more input wells penetrating a formation containing oil, either prior to or concurrently with the first portions of the mobility control polymer, an effective amount of one or more polymer conserving agents.

The displacing or flooding media which are suitable herein comprise water containing from 0.001 to 0.2 weight percent of a water-soluble organic mobility control polymer having a molecular weight of at least about $1.5 \times 10^6$. Said polymers are of the formula

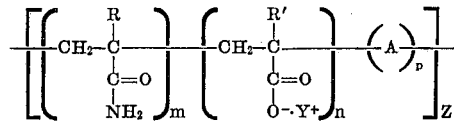

wherein R and R' are, independently, H or —CH$_3$; Y$^+$ is H, —NH$_4$ or an alkali (such as Na or K) or alkaline earth (such as Mg or Ca) metal; $m$ is 0 to 100; $n$ is 0 to 100, preferably 0 to about 67; $p$ is 0 to 100, preferably 0 to about 33; $m + n + p$ equal 100; Z is greater than about 200; and A is at least one of the following:

| | | |
|---|---|---|
| (1) | 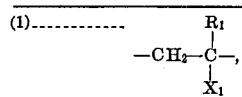 | wherein R$_1$ is H or —CH$_3$ and X$_1$ is —CN, —OCCH$_3$ (with O double bond), —OCH, —OH, —OCH$_3$, —CCH$_3$ (with O double bond), —SO$_3^-$·Y$^+$ or —COCH$_3$; |
| (2) | 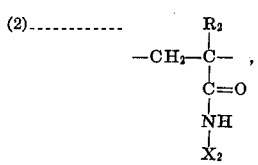 | wherein each R$_2$ is H or —CH$_3$ and X$_2$ is —CH$_2$OH, —CHSO$_3^-$·Y$^+$, —CHCH$_2$SO$_3^-$·Y$^+$, —CH$_2$CHOH or 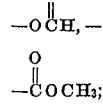 —C(CH$_3$)$_2$CH$_2$CCH$_3$; |
| (3) | 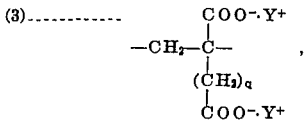 | wherein q is 0 or 1; |
| (4) | 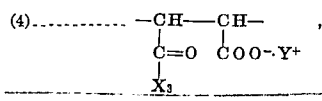 | wherein X$_3$ is —O$^-$·Y$^+$, —NH$_2$ or —OR$_3$ (R$_3$ being —CH$_3$ or —CH$_2$CH$_3$); or |

(5) 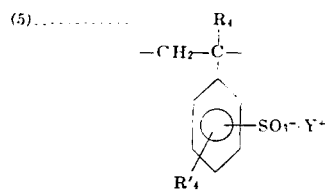

wherein $R_4$ and $R'_4$ are, independently, H or $-CH_3$.

The polymer conserving agents which are suitable herein comprise water containing from 0.01 to 20 weight percent of at least one water-soluble polymer selected from the group defined by the above formula, wherein, in said formula, m, n and p may each vary from 0 to 100, $m + n + p$ equaling 100; Z is less than about 70, preferably from about 0.2 to about 60; and R, R', Y and A are as defined above. Said conserving agents typically have a molecular weight between about 2,000 and about 500,000.

The polymer conserving agent is suitably introducing into the formation to be treated in an amount equal to from about 0.2 to 50 percent of the pore volume of said formation.

Both the mobility control polymers and the polymer conserving agents are suitable for use in either essentially pure water or in brines. The term "water" is used throughout to include brines as well as pure water.

DETAILED DESCRIPTION OF INVENTION

The mobility control polymers which are amenable to preservation by the process of this invention are generally described by the above formula. They are known to the water-flooding and soil-treating art, their characteristics and synthesis being described in many patents and in the literature.

For instance, polymers containing one or more of the monomers acrylamide, acrylic acid (and ammonium, alkali and alkaline earth metal slats thereof), acrylonitrile, vinyl acetate, vinyl formate, methyl vinyl ether and methyl acrylate are described in the following U.S. Pats. No. 3,039,529 (McKennon) Col. 2, lines 9–18 and 51–67; No. 2,827,964 (Sandiford et al.) Col. 2, lines 7–17; No. 2,842,492 (Von Engelhardt et al.) Col. 1, lines 30–52; No. 3,282,337 (Pye) Col. 4, line 19 to Col. 5, line 27; No. 3,476,186 (Sarem) Col. 1, line 60 to Col. 2, line 73; and No. 2,625,529 (Hedrick) Col. 3, line 60 to Col. 7, line 65 and the examples thereof. Numerous other sources are also available.

Other suitable monomers are exemplified in the following: N-methylolacrylamide, salts of N-sulfomethylacrylamide, N-acryltaurine, N-(2-hydroxyethyl) -acrylamide, N-(diacetonyl)-acrylamide, and the like — Pye, Sarem (Col. 3, line 64 to Col. 8, line 67), and Hedrick; salts of itaconic acid - Von Engelhardt and Hedrick; maleic and maleamic acids, salts and half-esters thereof — Von Engelhardt and Hedrick; and styrene, vinyl toluene and alpha-methylstyrene sulfonates — Pye (Col. 5, line 28 to Col. 6, line 5) and Hedrick.

Von Engelhardt (Col. 1, lines 59–66 and Col. 2, lines 16–28) further shows the preparation of salts of some of the above.

Homopolymers and copolymers of acrylamide and the acid or acid salt demonstrate no solubility problems. However, it must be borne in mind that certain monomers characterized as $+ A +$ in the formula above must be solubilized. For instance, incorporation of more than about 65 weight percent acrylonitrile retards solubility; more than about 30 weight percent of the esters, ethers and ketone illustrated in Group (1) has the same effect; and, finally, if $X_2$ in Group (2) is more than about 40 weight percent alcohol or ketone residues, solubility is also adversely affected. However, incorporation of other $+ A +$ groups, or acrylamide or acrylic acid or acid salt monomers for the remainder of the copolymer will result in sufficient solubility.

It is typical in secondary oil recovery operations to utilize brine and polymer as the flooding medium. Often these brines contain divalent ions, such as $Ca^{++}$, which may precipitate the polymer. Therefore, the preferred mobility control polymers are those which do not precipitate in the presence of, for instance, $Ca^{++}$. Preferred polymers, then, are selected from the following group:

1. 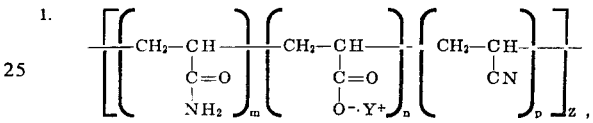

where $m + p$ is greater than about 35, $p$ is less than about 65, $n$ is greater than about 15, $m + n + p = 100$, $Y^+$ is as above defined and Z is greater than about 200;

2. 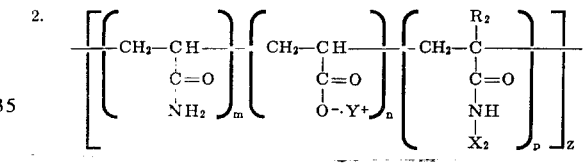

wherein $X_2$ is

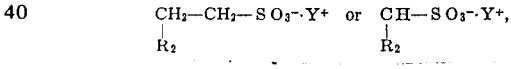

each $R_2$ is H or $-CH_3$, $m + p$ is greater than about 35, $n + p$ is greater than about 15, $m + n + p = 100$, $Y^+$ is as above defined and Z is greater than about 200;

3. 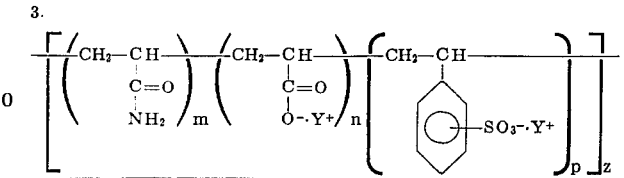

wherein $m + p$ is greater than about 35, $n + p$ is greater than about 15, $m + n + p = 100$, $Y^+$ is as above defined and Z is greater than about 200; or 4. 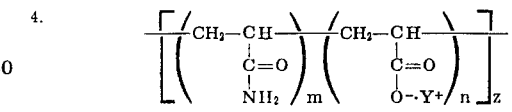

wherein $m$ is greater than about 35, $n$ is greater than about 15, $m + n = 100$, $Y^+$ is as defined above and Z is greater than about 200. Those polymers of Group 4 are the most preferred.

The polymer conserving agents suitable herein are prepared from the same types of monomers as used for the mobility control polymers; however, said agents have a substantially lower molecular weight than the mobility control polymers. Therefore, the above sources regarding the description and preparation of the mobility control polymers are also applicable to the conserving agents. The preferred polymer conserving agents are also selected from the above groups (1-4).

Both the mobility control polymers and polymer conserving agents are suitable for use in either essentially pure water or in brine.

The above teachings regarding solubility considerations and divalent ion sensitivity also pertain to the conserving agents. Further, the same types of polymers which are taught as the preferred mobility control polymers are the types which are preferred for utilization as conserving agents.

While about a 0.001 to 0.2 weight percent aqueous solution of mobility control polymer is suitable, about 0.01 to 0.15 weight percent is preferred. Further, a polymer molecular weight of at least about $2.5 \times 10^6$ is also preferred.

Regarding the polymer conserving agent, a 0.01 to 20 weight percent aqueous solution is suitable, while about 0.1 to 7 weight percent is preferred. A 1 percent solution is typical. Solubility or viscosity must, however, be considered. A treating volume of about 2 to 25 percent of the formation pore volume is also preferred.

Although, in general, the polymer conserving agent will be added ahead of or concurrently with the first portions of the mobility control polymer, in some instances, as when the reservoir contains some high permeability layers which cause much channeling of the injection fluid, it may be desirable to inject the agent at some time in the flood after the injection of the polymer has started. If channeling is severe, injection of the agent ahead of the polymer will result in almost all of the agent flowing into the channel. This will result in gross overtreatment of the channeling portion of the reservoir, through which the polymer would undoubtedly make its way even if the agent were not employed. If the agent is employed in the first portion of the polymer bank, the situation would be somewhat improved, since the blocking effect of the polymer in the channeling sections would result in the direction of more of the agent into other parts of the reservoir. Still better results would be obtained if the agent is not injected until the channeling portions of the reservoir are blocked by the polymer to such an extent that substantial diversion of flow into other portions of the reservoir has begun to occur, but before very much cumulative flow into these parts of the reservoir has occurred. In this way, the agent will be emplaced to a greater degree in those parts of the reservoir where adsorption of the polymer would otherwise be of significant importance in inhibiting the penetration of the polymer into the oil-bearing formation.

Refinements of the above are possible to deal with specific conditions. For example, an initial small quantity of the agent could be used ahead of the first portion of polymer. This amount of agent would be just large enough to stop adsorption of the polymer in the channeling part of the reservoir. This would help to speed up the penetration of the channels by the polymer. After the injection of an amount of polymer necessary to divert flow into other portions of the reservoir, a second portion of agent could be added to prevent adsorption in the parts of the reservoir now receiving a greater portion of the injection fluid. Even a third staging of this kind is conceivable, but this degree of refinement generally will not be necessary.

In applying a polymer plus agent flooding technique to a stratified reservoir which has a considerable amount of permeability heterogeneity, the following rules of thumb may be applied:

1. The high permeability strata will be substantially penetrated by the polymer even though the agent is not employed. The flood should be conducted so that the injection of excessively large amounts of agent into these zones is avoided as far as possible. The tactics of the preceding paragraph may be employed.
2. Low permeability sections of the reservoir will generally not produce injected fluid even if no agent is used with the polymer. Most such layers will not produce injection fluid even when waterflooded. Agent injected into such layers is wasted. These layers should not figure greatly in the calculation of the amount of agent required.
3. In the median permeabilities of the reservoir, the adsorption of the polymer may play an important part in the efficiency with which the oil will be displaced. The flood should be designed to put as much of the agent as possible into these zones.

While the preceding discussion is based on the use of mobility control polymers for improving the efficiency of water flooding, such polymers are also employed in other more complex secondary and tertiary oil recovery processes in which an aqueous fluid is employed during part of the displacing operation. For example, Gogarty (U.S. Pat. No. 3,406,754) describes the value of employing a mobility control polymer in the aqueous fluid used to displace a previously injected bank of a micellular fluid through a petroleum-bearing formation. Adsorption of the polymer from the front of the displacing fluid would result in the generation of a high mobility, polymer-free bank of water between the micellular fluid bank and the low mobility, polymer-bearing displacing fluid. This high mobility water would tend to finger through and bypass the micellular bank, thus destroying the integrity of the bank and reducing the efficiency of the recovery process. The polymer conserving agents of this invention are valuable when utilized in such a process.

The value of the polymer conserving agents is similar in cases where, in place of a micellular fluid, the advance bank consists of other fluids which add to the oil recovery process and with which aqueous fluids containing mobility control polymers might be advantageously employed. Fluids recognized to be useful in the advance bank include, for example, certain alcohols, soluble oils (Holm, U.S. Pat. No. 3,537,520), certain stable oil-in-water emulsions, anhydrous ammonia, carbon dioxide, aqueous solutions of these two gases, caustic soda, aqueous solutions of surface active or detergent chemicals, liquified petroleum gases (in those cases where water and "dry gas" are combined to drive the bank of liquified gases), and the like. Aqueous solutions of certain inorganic salts and acids have also been proposed for improved recovery of oil under certain conditions. The use of mobility control polymers in conjunction with such improved recovery materials is of value, and supplementing such polymers with polymer conserving agents is of benefit when adsorption of the polymer is found to be high.

When the improved recovery material is used in the form of an aqueous solution or a water-external phase emulsion, the incorporation of a mobility control polymer in the bank containing the improved recovery agent, as well as in the aqueous drive fluid, would insure satisfactory control of mobility throughout the entire process of oil displacement. Again, the use of a polymer conserving agent in the first portions of the injected fluid would be of benefit where adsorption of the polymer is great enough to adversely affect the process.

SPECIFIC EMBODIMENTS

Example 1

A one-inch long by one-inch diameter cylinder of Berea sandstone was mounted so that fluids could be passed through it in the axial direction. The "plug" was initially saturated with 3 percent sodium chloride brine. The core was then flooded with petroleum hydrocarbon and again flushed with brine until no further hydrocarbon production was observed.

Next, a 500 ppm solution of a hydrolyzed polyacrylamide polymer ($\approx$20 percent hydrolyzed with a molecular weight of about $3 \times 10^6$) in 3 percent aqueous NaCl(pH7) was introduced into the core until 20 cc had entered. The effluent was collected. A slow flow rate of 0.3 ml/min was employed during this stage, as an approach to equilibrium adsorption conditions was desired. Next, the polymer solution was displaced from the specimen with 15 cc of polymer-free 3 percent brine, and the effluent from this step was combined with the other to give a total effluent volume of 35 cc. The polymer concentration in this effluent was determined by a turbidimetric method similar to that proposed by Michaels and Morelos (Ind. Eng. Chem., 47, 1801–1809, (1955) ). The amount of polymer recovered was calculated from the concentration and effluent volume and found to be 70 percent of the quantity of polymer introduced into the plug.

A second identical plug was flooded with the same sequences of brine and oil as the first. A solution of 500 ppm of the indicated polymer conserving agent in 3 percent aqueous NaCl (pH7) was passed slowly through the core over a period of about an hour. The agent was distinctly present in the effluent for a substantial portion of this flow period. The plug was then flushed with 3 percent aqueous NaCl for an extended period. No agent was observed in the effluent after the initial portions of the brine flush. Next, polymer solution and brine were flowed through the specimen, and the effluent was analyzed just as in the untreated plug run. The analyses are indicated in the following table.

| No. | Polymer Conserving Agent | % Mobility Control Polymer Recovered |
|---|---|---|
| 1. | Carbopol WS801 (B.F. Goodrich) - Salt of polyacrylic acid. * | 90% |
| 2. | Acrysol GS (Rohm & Haas) - Sodium polyacrylate. * | 90% |
| 3. | Cypan C (American Cyanamid) - Salt of polyacrylic acid. * | 93% |
| 4. | Hydrolyzed (~16%) low M.W. (~200,000) polyacrylamide. | 95% |
| 5. | Salt of acrylonitrile/acrylic acid ** copolymer. * | 95% |
| 6. | None | 70% |

* These polymers have a molecular weight between about 150,000 and 400,000.
** Tested four compounds between 40 and 70% acrylic acid content - all performed at about 95%.

A third identical plug was flooded with the same sequence of brine and oil as the first and second above. 500 ppm of the above low molecular weight polyacrylamide in an aqueous solution of 3% NaCl and 0.3% CaCl$_2$ was passed through the core as above, and the plug flushed with 3% aqueous NaCl until no further agent appeared. Polymer solution was then passed through as above, and the effluent analyzed. 95% of the mobility control agent was recovered.

Copolymers of acrylic acid and acrylonitrile are also very tolerant of the calcium ion, and would be particularly effective as polymer conserving agents in the presence of divalent ions.

Example 2

A four-inch long by 0.82 inch diameter cylinder of Miocene sand was mounted so that fluids could be passed through it in the axial direction. The plug was initially cleaned with perchloro-ethylene and acetone and subsequently saturated with 3% sodium chloride brine.

Next, a 250 ppm solution of a hydrolized polyacrylamide polymer ($\approx$20 percent hydrolized with a molecular weight of about $5 \times 10^6$, i.e., $m = 80, n = 20, Z = \approx 580$ in the above formula) in 3 percent aqueous sodium chloride (pH7) was introduced into the plug at a rate of 0.4 cc/min until 10 cc had entered. Next, the polymer solution was displaced from the plug with 30 cc of polymer-free 3 percent brine, and the effleunt was combined with the other to give a total effluent volume of 40 cc. The polymer concentration in this effluent was determined and the polymer recovered was calculated as above. The process of polymer solution injection and displacement with brine was repeated until no additional polymer loss was detected. The adsorption of the polymer was then calculated as the total weight of polymer not recovered in the effluent(s) divided by the dry weight of sand in the plug.

An identical plug was cleaned and saturated with brine as before. A solution of 500 ppm of the indicated polymer conserving agent in 3 percent aqueous NaCl (pH7) was passed slowly through the plug until at least 50 cc had been injected. In some cases an additional 20 cc of 5,000 ppm polymer conserving agent was passed through to insure saturation of the sand surfaces. The plug was then flushed with 3 percent aqueous NaCl until no agent was detected in the effluent. Next, a solution of the mobility control polymer in brine was introduced, effluents analyzed and adsorption calculated as in the previous example. Results ot these tests are given in the following table.

| POLYMER CONSERVING AGENT | M | N | Z | Adsorption, $\mu G/G^1$ |
|---|---|---|---|---|
| none | | | | 80 |
| Sodium salt of polyacrylic acid | 0 | 100 | 0.4 | 3 |
| Hydrolyzed polyacrylamide, sodium salt | 15 | 85 | 25 | 2 |
| Hydrolyzed polyacrylamide, sodium salt | 44 | 56 | 25 | 1 |
| Hydrolyzed polyacrylamide, sodium salt | 57 | 43 | 25 | 0 |

$^1$ $\mu$ g. of mobility control polymer per g. of sand.

I claim:

1. In a process for recovering petroleum from a subterranean oil-bearing formation by introducing into one or more input wells penetrating said formation a flooding medium comprising water containing from 0.001 to 0.2 weight percent of a water-soluble organic mobility control polymer having a molecular weight of at least about $1.5 \times 10^6$, said polymer being of the formula

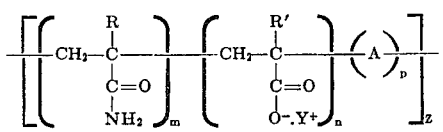

wherein R and R' are, independently, H or —CH$_3$; Y$^+$ is H, —NH$_4$ or an alkali or alkaline earth metal; m, n and p vary from 0 to 100, $m + n + p$ equaling 100; Z is greater than about 200; and A is at least one of the following:

$$-CH_2-\underset{\underset{X_1}{|}}{\overset{\overset{R_1}{|}}{C}}-,$$

Wherein R$_1$ is H or —CH$_3$ and X$_1$ is —CN, $$-O\overset{O}{\overset{\|}{C}}CH_3, -O\overset{O}{\overset{\|}{C}}H, -OH, -OCH_3, -\overset{O}{\overset{\|}{C}}CH_3, -SO_3^-\cdot Y^+ \text{ or } -\overset{O}{\overset{\|}{C}}OCH_3$$

$$-CH_2-\underset{\underset{\underset{X_2}{|}}{\underset{NH}{|}}}{\overset{\overset{R_2}{|}}{\underset{C=O}{\overset{|}{C}}}}-,$$

wherein each R$_2$ is H or —CH$_3$ and X$_2$ is $$-CH_2OH, \underset{\underset{R_2}{|}}{CHSO_3^-\cdot Y^+}, \underset{\underset{R_2}{|}}{-CHCH_2SO_3^-\cdot Y^+},$$

$$-CH_2-\underset{\underset{R_2}{|}}{C}HOH \text{ or } -C(CH_3)_2CH_2\overset{O}{\overset{\|}{C}}CH_3;$$

$$-CH_2-\underset{\underset{\underset{COO^-\cdot Y^+}{|}}{\underset{(CH_2)_q}{|}}}{\overset{\overset{COO^-\cdot Y^+}{|}}{C}}-,$$

wherein q is 0 or 1;

$$-CH-----CH-\\ \underset{\underset{X_3}{|}}{\overset{|}{C=O}} \quad \overset{|}{COO^-\cdot Y^+}$$

wherein X$_3$ is —O$^-\cdot$Y$^+$, —NH$_2$ or —OR$_3$ (R$_3$ being —CH$_3$ or —CH$_2$CH$_3$); or $$-CH_2-\underset{\underset{R'_4-\phi-SO_3^-\cdot Y^+}{|}}{\overset{\overset{R_4}{|}}{C}}-,$$

wherein R$_4$ and R'$_4$ are, independently, H or —CH$_3$;

the improvement comprising introducing into said input well or wells prior to or concurrently with the first portions of the mobility control polymer an amount of a polymer conserving agent which equals from about 0.2 to 50 percent of the pore volume of the formation to be treated, said polymer conserving agent comprising water containing from about 0.01 to 20 weight percent of at least one water-soluble polymer selected from the group defined by the above formula, wherein, in said formula, Z is less than about 70, the other variables being as defined above.

2. The process of claim 1 wherein, in the formula describing the mobility control polymer, n varies from 0 to about 67 and p varies from 0 to about 33.

3. The process of claim 1 wherein, in the formula describing the polymer conserving agents, Z varies from about 0.2 to about 60.

4. The process of claim 1 wherein the flooding medium comprises water containing from about 0.01 to 0.15 weight percent of the mobility control polymer.

5. The process of claim 1 wherein the molecular weight of the mobility control polymer is at least about $2.5 \times 10^6$.

6. The process of claim 1 wherein the polymer conserving agent comprises water containing from about 0.01 to 7 weight percent of polymer.

7. The process of claim 1 wherein the polymer conserving agent is employed at from about 2 to 25 percent of the pore volume.

8. The process of claim 1 wherein the mobility control polymer is selected from the group:

A.
$$\left[\left(\begin{array}{c}CH_2-CH\\|\\C=O\\|\\NH_2\end{array}\right)_m\left(\begin{array}{c}CH_2-CH\\|\\C=O\\|\\O^-\cdot Y^+\end{array}\right)_n\left(\begin{array}{c}CH_2-CH\\|\\CN\end{array}\right)_p\right]_z$$

wherein $m + p$ is greater than about 35; p is less than about 65; n is greater than about 15; $m + n + p = 100$; Y$^+$ is H, —NH$_4$ or an alkali or alkaline earth metal; and Z is greater than about 200;

B.
$$\left[\left(\begin{array}{c}CH_2-CH\\|\\C=O\\|\\NH_2\end{array}\right)_m\left(\begin{array}{c}CH_2-CH\\|\\C=O\\|\\O^-\cdot Y^+\end{array}\right)_n\left(\begin{array}{c}R_2\\|\\CH_2-C-\\|\\C=O\\|\\NH\\|\\X_2\end{array}\right)_p\right]_z$$

wherein X$_2$ is $$\underset{\underset{R_2}{|}}{-CH-CH_2-SO_3^-\cdot Y^+}, \text{ or } \underset{\underset{R_2}{|}}{-CH-SO_3^-\cdot Y^+},$$

each R$_2$ is H or —CH$_3$, $m + p$ is greater than about 35, $n + p$ is greater than about 15, $m + n + p = 100$ and Y$^+$ and Z are as above;

C.
$$\left[\left(\begin{array}{c}CH_2-CH\\|\\C=O\\|\\NH_2\end{array}\right)_m\left(\begin{array}{c}CH_2-CH\\|\\C=O\\|\\O^-\cdot Y^+\end{array}\right)_n\left(\begin{array}{c}CH_2-CH\\|\\\phi-SO_3^-\cdot Y^+\end{array}\right)_p\right]_z,$$

wherein $m + p$ is greater than about 35, $n + p$ is greater than about 15, $m + n + p = 100$ and Y$^+$ and Z are as above; or D.
$$\left[\left(\begin{array}{c}CH_2-CH\\|\\C=O\\|\\NH_2\end{array}\right)_m\left(\begin{array}{c}CH_2-CH\\|\\C=O\\|\\O^-\cdot Y^+\end{array}\right)_n\right]_z,$$

wherein m is greater than about 35, n is greater than about 15, $m + n = 100$ and Y$^+$ and Z are as above.

9. The process of claim 8 wherein the polymer conserving agent is water containing at least one polymer selected from the group A to D in said claim 8, wherein, in the formulas, Z is greater than about 0.2 but less than about 60, the other variables being as defined therein.

10. The process of claim 1 wherein the mobility control polymer is of the formula wherein *m* is greater than about 35, *n* is greater than about 15, $m + p = 100$ and $Y^+$ and Z are as above, and the polymer conserving agent is water containing a polymer of the formula
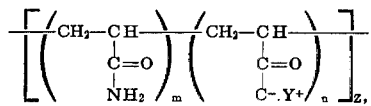
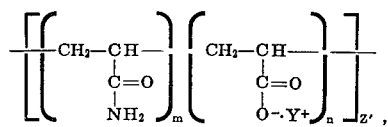
wherein $Z'$ is between about 0.2 and 60, and $Y^+$, m and n are as above defined.
* * * * *